UNITED STATES PATENT OFFICE.

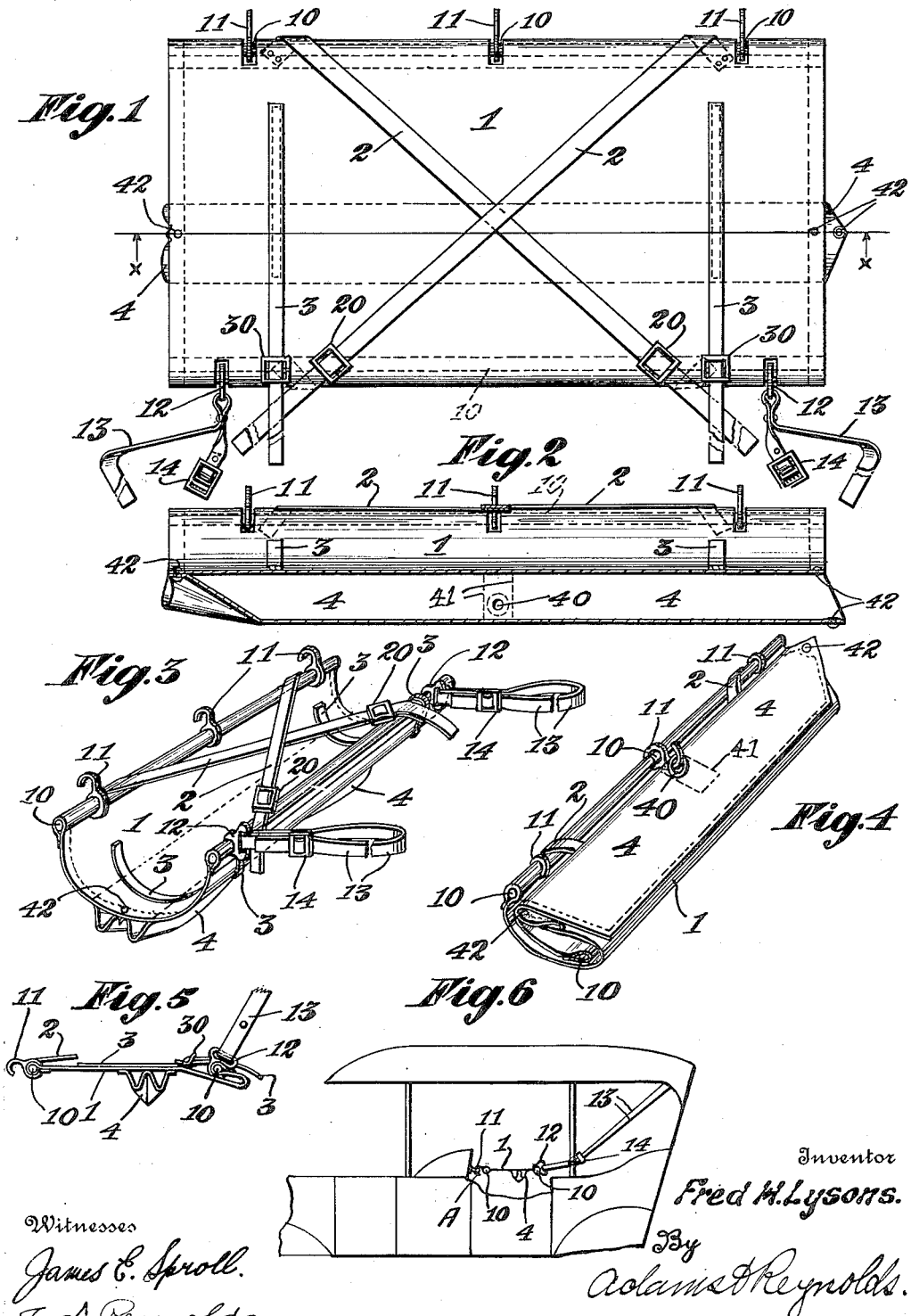

FRED H. LYSONS, OF SEATTLE, WASHINGTON.

BABY-CARRYING HAMMOCK FOR AUTOMOBILES.

1,182,184. Specification of Letters Patent. Patented May 9, 1916.

Application filed March 25, 1915. Serial No. 17,012.

*To all whom it may concern:*

Be it known that I, FRED H. LYSONS, a citizen of the United States of America, and a resident of the city of Seattle, in the county of King and State of Washington, have invented certain new and useful Improvements in Baby-Carrying Hammocks for Automobiles, of which the following is a specification.

My invention consists of a device which is designed for attachment more particularly to an automobile, for the purpose of forming a supplemental or additional carrier. The use for which it has been particularly designed and intended, is the provision of a support or bed for carrying an infant.

The device partakes in general of the character of a cot or hammock. The supporting device consists of a sheet of fabric which is provided with means for securing it at two opposite edges to parts of the automobile so that it may be supported in front of a seat.

The particular construction of my invention as herein illustrated, will be described in the following specification and the features thereof which are claimed as new will be defined in the claims terminating the specification.

The construction illustrated in the accompanying drawing, and hereinafter described is that which is now preferred by me.

Figure 1 is a plan view of the device in its extended position, or that occupied when in use, the parts of the automobile or other structure to which it may be applied, not being shown. Fig. 2 is a vertical section taken on lines *x—x* of Fig. 1. Fig. 3 is a perspective showing the device in the position assumed when in use. Fig. 4 is a perspective showing the device rolled up. Fig. 5 is an end view of the device in its open position. Fig. 6 is side view showing portions of an automobile showing the device applied thereto.

The sheet of fabric 1 which forms the supporting member of the device, has a bar 10 secured to each of the two side edges thereof. This sheet of fabric and the two bars resemble the corresponding parts of an ordinary cot in their action. The bar 10 which is at one side of the sheet has a series of hooks 11 thereon, or is provided with equivalent members by which it may be secured to whatever body it is desired upon which to support one side of the device. As herein illustrated in Fig. 6 these hooks are placed over a bar A which is ordinarily secured to the rear side of the front seat of an automobile for the purpose of holding robes, coats, etc.

The bar 10 which is at the other side of the sheet 1 has rings 12 or equivalent devices to each of which is secured one end of a strap 13 which should be of sufficient length to reach to a suitable support, such support as shown in Fig. 6, being a member of the frame of the automobile top. This strap or whatever equivalent member be employed should be provided with means for securing it at any desired length, such means as illustrated consisting of a buckle 14.

I have provided two straps 2 secured by an end to one side of the hammock and extending across the top thereof to the opposite side where they are adjustably secured to buckles 20 secured at said side. These straps are intended to hold in the hammock whatever is placed therein and herein shown as extending diagonally across the same, although they may be extended directly across if desired. I have also provided two straps 3 secured by one end to the sheet 1 but unsecured thereto for a distance at the side which would be placed toward the rear as it would be installed in an automobile. The free end of this strap passes through a catch buckle 30 secured at the edge of the hammock. By tightening these straps the effective width of the hammock may be adjusted whereby it may be accommodated to limited quarters.

Extending centrally beneath the sheet 1 is a supplemental sheet 4 which is stitched there along its edges. The width of this sheet is enough greater than the distance separating the points where it is stitched to the sheet 1, that the space between the two may be utilized as a pocket for the storage of articles.

Preferably the material composing this pocket is gathered together at a point intermediate its ends, and the slack therein taken up by securing the fold, as by sewing, as shown at 41, so as to divide the pocket into two compartments. I have shown this sewed portion as being provided with an eyelet 40. I also prefer to provide each end with means whereby the central or loose part thereof may be drawn up and secured. The means illustrated consists of a clasp button 42.

When the device is not in use the straps and loose parts may be placed upon the sheet 1 and the rear edge folded inward so as to bring the eyelet 40 up to the central hook 11 over which it may be placed to hold the device in folded position as is shown in Fig. 4.

Having thus described my invention what I claim as new and desire to secure by Letters Patent of the United States of America, is:

1. In a device of the character described, a supporting sheet, supporting means carried by each edge thereof, straps extending transversely across said sheet and secured thereto for a material part of the width of the sheet, said connection between the sheet and straps terminating at a distance inward from an edge, means for securing said straps to this edge to optionally take up material between the point of termination of this connection and the edge.

2. In a device of the character described, a supporting sheet, supporting means carried by one edge thereof, straps connected with the other edge of said supporting sheet and adapted for supporting engagement rearwardly from said supporting sheet, and a fabric strip secured by its edges beneath and extending lengthwise said supporting sheet, said strip being wider than the distance between the lines by which it is secured to the supporting strip, whereby it will depend to form a pocket, the slack of said strip being secured at a point intermediate its length to divide said pocket into two parts.

3. In a device of the character described, a supporting sheet having supporting hooks upon its forward edge, straps or like members secured to the rear edge of the supporting sheet and adapted for supporting engagement rearwardly thereof, and an eyelet secured in said sheet and adapted to engage one of the hooks to maintain the sheet in rolled condition.

Signed at Seattle, Washington, this 18 day of March, 1915.

FRED H. LYSONS.

Witnesses:
BEULAH ORR TERRY,
JOHN F. ALLEN.